J. E. RIELLY.
SPRING WHEEL.
APPLICATION FILED NOV. 2, 1907.
926,769.
Patented July 6, 1909.
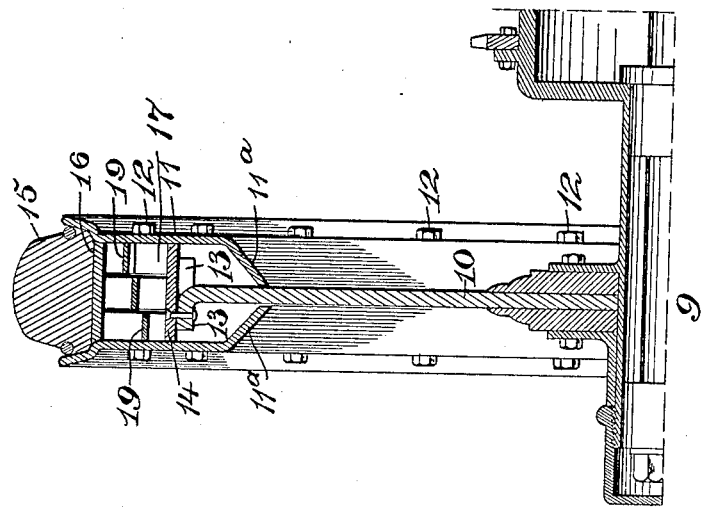
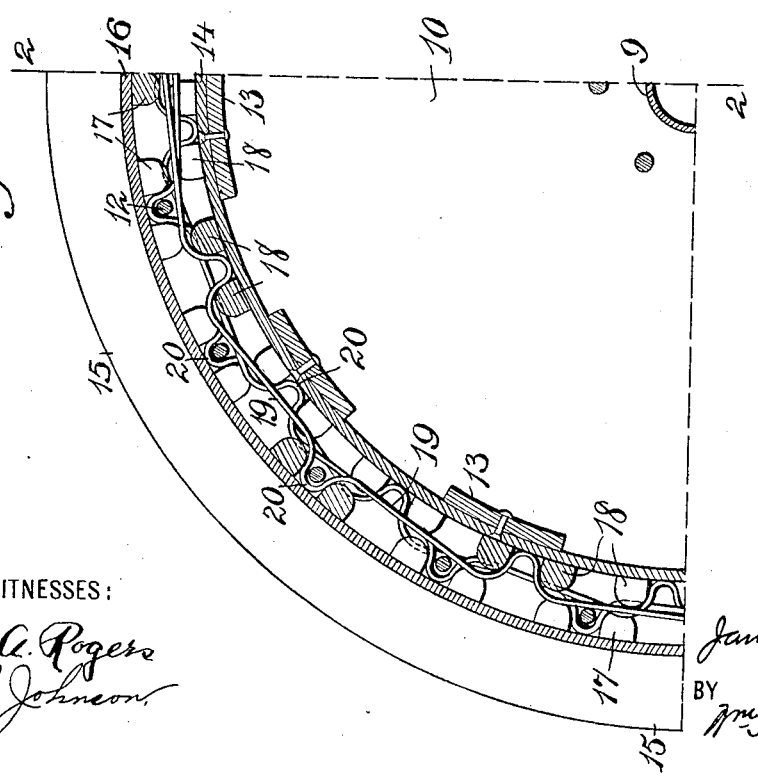
WITNESSES:
S. C. Rogers
R. Johnson
INVENTOR
James E. Rielly;
BY
Wm. H. Caufield.
ATTORNEY

UNITED STATES PATENT OFFICE.

JAMES E. RIELLY, OF NEWARK, NEW JERSEY.

SPRING-WHEEL.

No. 926,769.     Specification of Letters Patent.     Patented July 6, 1909.

Application filed November 2, 1907. Serial No. 400,335.

*To all whom it may concern:*

Be it known that I, JAMES E. RIELLY, a citizen of the United States, residing at Newark, in the county of Essex and State of New Jersey, have invented certain new and useful Improvements in Spring-Wheels; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a spring wheel, and is one in which a series of springs is placed between the felly and the rim to absorb the shock, and make an easy riding vehicle.

The improved feature in this wheel is the parallel arrangement of a series of springs, the springs being arranged side by side, running parallel with one another and having their contacting points arranged at stated intervals, these contacting points being staggered so that the number of bends or corrugations in each spring is reduced, but the number of points where the rim and felly contact with the springs is increased, that is more frequently around the circumference. This arrangement distributes the wear and causes the pressure, when applied at any point on the wheel, to be distributed among a number of contact points between the springs and the felly and the rim.

The invention is illustrated in the accompanying drawing, in which—

Figure 1 is a section of a quarter of a wheel, and Fig. 2 is a section taken transversely through line 2, 2, in Fig. 1.

In my construction, I embody any usual form of hub 9 which is provided with spokes or a disk 10. Flanking the disk 10, on either side and near the periphery thereof, are the side plates 11 with the inwardly turned portions 11ª arranged so as to nearly bear on the disk 10 and acting to shut out gravel and dust from the interior of the spring chamber. The side plates are held together by means of the bolts 12. Between the plates 11, the periphery of the disk 10 is supplied with the clips 13 which are turned alternately to one side and then the other to form a bearing for the felly 14. The tread portion 15 of the wheel is arranged to rest on an annular ring 16, this ring forming the rim of the wheel, and arranged to receive the pressure from the tread and transmit it to the springs.

Blocks 17 and 18 are fastened to the rim and the felly respectively, and are arranged with open spaces between them, in which fit the corrugations 20 of the springs 19. The springs 19 are arranged side by side, and can be two or more in number, but for the usual automobile wheel, three will be used. The blocks 17 and 18 are arranged so as to stagger the receptive openings, for the corrugations 20, so that none of the corrugations are in line transversely and are spaced apart so that they appear staggered, and at the same time each spring has less corrugations, but the contact points of the springs, with the rim and the felly, are multiplied over a construction where but one broad spring would be used.

Another advantage this construction has, is that if a spring breaks, the loss is not so great, a new spring can be easily inserted, and the cost of manufacture of the springs in this construction is less than if one spring were used.

Having thus described my invention, what I claim is:—

1. A wheel comprising a body portion having a felly, a rim surrounding the felly at a distance therefrom, blocks arranged on the rim and the felly, the blocks forming recesses between them, and springs having corrugations disposed alternately on the opposite sides thereof, the springs being in parallel arrangement and having the corrugations arranged out of transverse alinement.

2. A spring wheel comprising a body portion formed of a disk having a felly thereon, a rim formed of side plates and a tread portion, the side plates inclosing the felly, blocks on the felly and on the under side of the tread portion, the blocks forming recesses between them, and a series of springs in parallel arrangement having corrugations arranged to alternately engage the recesses in the blocks on the felly and the rim, the corrugations being arranged in recesses out of transverse alinement.

In testimony that I claim the foregoing, I have hereunto set my hand this twenty sixth day of October 1907.

JAMES E. RIELLY.

Witnesses:
   GUSTAVUS A. RICHARDS,
   FREDERICK B. RICHARDS.